United States Patent [19]

Ishiguchi et al.

[11] Patent Number: 5,682,456
[45] Date of Patent: Oct. 28, 1997

[54] VCR OPERATING APPARATUS HAVING MULTI-FUNCTION KEYPAD ENABLING

[75] Inventors: Fusao Ishiguchi; Moriyasu Yoshitake; Shingo Izuta, all of Daito, Japan

[73] Assignee: Funai Electric Co., Ltd., Osaka, Japan

[21] Appl. No.: 450,084

[22] Filed: May 25, 1995

Related U.S. Application Data

[63] Continuation of Ser. No. 236,016, May 2, 1994, abandoned, which is a continuation of Ser. No. 957,035, Oct. 6, 1992, abandoned.

[30] Foreign Application Priority Data

Nov. 29, 1991 [JP] Japan .................................. 3-316351
Mar. 10, 1992 [JP] Japan .................................. 4-051334

[51] Int. Cl.$^6$ .................................. H04N 5/91; G11B 5/00
[52] U.S. Cl. .................................. 386/83; 360/32
[58] Field of Search .................................. 358/335, 310, 358/342; 360/33.1, 69, 79; 455/151, 181.1, 186.1, 182; 348/736; 386/46, 83, 123, 124, 109, 1; G11B 5/00; H04N 5/91

[56] References Cited

U.S. PATENT DOCUMENTS

| | | | |
|---|---|---|---|
| 4,623,887 | 11/1986 | Welles, II | 340/825.57 |
| 4,706,121 | 11/1987 | Young | 358/142 |
| 4,866,542 | 9/1989 | Shimada et al. | 360/10.3 |
| 4,908,713 | 3/1990 | Levine | 358/335 |
| 5,187,469 | 2/1993 | Evans et al. | 340/825.22 |

OTHER PUBLICATIONS

Symphonic Owner's Manual, pp. 1–32 (1990).

*Primary Examiner*—Robert Chevalier
*Attorney, Agent, or Firm*—Dickstein Shapiro Morin & Oshinsky LLP

[57] ABSTRACT

A video tape recorder operating apparatus operates a video cassette recorder comprehending a recorder body and a remote controller. A first key group including a pause key and a VCR/TV switchover key is provided on the recorder body 10 for instructing the basic operations thereof, and a second key group including a menu-mode key and a select key is provided on the remote controller 18 for instructing secondary operations, such as menu display in the menu mode and the selection of processes itemized therein, which are different from the basic operations. With this apparatus, the first key group can be empowered to instruct the secondary operations.

32 Claims, 10 Drawing Sheets

```
               M E N U
⇒1. CLOCK/COUNT      → CLOCK
 2. COUNTER RESET    → ▯▯▯▯
 3. COUNTER MEMO     → M-ON
 4. SPEED            → SP
⇒5. TIMER PROGRAMMING
 6. CLOCK SET
 7. CHANNEL PRESET
 8. CHANNEL ADD/CLEAR
 9. AUTO REPEAT
```

⇩

```
           10/21 TUE 10:20 AM
     DATE   START/END   CH   MD
[1]  --/--    --:--
              --:--     --   --
 2   --/--    --:--
              --:--     --   --
 3   --/--    --:--
              --:--     --   --
 4   --/--    --:--
              --:--     --   --
```

⇩

```
           10/21 TUE 10:20 AM
     DATE   START/END   CH   MD
 1   --/--    --:--
              --:--     --   --
[2] 11/03   02:00PM
            03:30PM     56   LP
 3   --/--    --:--
              --:--     --   --
 4   --/--    --:--
              --:--     --   --
```

VCR OPERATING APPARATUS HAVING MULTI-FUNCTION KEYPAD ENABLING

This application is a continuation of application No. 08/236,016, filed May 2, 1994, now abandoned which is a continuation of application No. 07/957,035 filed Oct. 6, 1992, now abandoned.

BACKGROUND OF THE INVENTION

The present invention relates to an operating apparatus for application in a video recorder. More specifically, it relates to an operating apparatus functioning in a video recorder characteristically comprising a recorder body, a remote controller and tuning means for selecting broadcast frequency. (1) Primary operations of a video recorder include recording and reproduction of television broadcast signals, and fast-forwarding and rewinding of video recording tape in cassettes; additionally, the VCR is capable of such auxiliary operations as channel-preselect and recording-schedule programming. All of these operations may be instructed through a remote controller.

U.S. Pat. No. 4,908,713 discloses a video recorder equipped with a cable-linked remote controller through which the primary and auxiliary operations are instructed. All operating commands are issued to the VCR fully via the remote controller, and consequently the recorder main body does not contain any operational input keys.

A drawback of the aforedescribed video recorder, however, is that should the remote controller break down, it becomes impossible to command even the VCR's primary functions.

It is also taught that such a video recorder can receive operational input through a wireless remote controller. Therein too, the wireless remote controller may become lost, leaving the video recorder inoperable.

In order to provide recourse to the difficulty which arises should the remote controller fall or become missing, operating instruction keys may be provided on the video controller body in addition to those on the remote controller. However, the resultant structure of the video recorder would then be complicated by the redundancy of the instruction keys. (2) Operating apparatus for video recorders are further taught which utilize an on-screen display capability of a television receiver connected therewith in order to provide display corresponding to auxiliary operations during a menu process. When a recording schedule, for example, is to be established, a single-function menu key is pressed which is provided on the remote controller or the main body of the video controller, whereupon a menu is displayed on the TV screen. A recording-schedule item is then selected from the menu, and a schedule is programmed accordingly.

The video recorder thus will include such single-function keys as necessary for menu display, etc., increasing the number of keys required on either the video recorder itself, or on the remote controller, and raising the manufacturing cost.

SUMMARY OF THE INVENTION

It is an object of the present invention to enable the operational instructing of a video recorder despite cases in which its remote controller cannot be utilized, moreover maintaining simplicity of the recorder body structure.

It is a further object to decrease the number of instruction keys therein.

An operating apparatus according to an aspect of the present invention is for use in a video recorder comprising a recorder body and a remote controller, and it includes a first key group, a second key group, and multi-functioning means. The first key group is provided on the video recorder body for instructing a first group of operations. The second key group is provided on the remote controller for instructing a second group of operations which are different from the first group of operations. The multi-functioning means enables instructing of the second group of operations using the first key group.

Should the remote controller fall or become missing, such that operation via the remote controller is impossible, the multi-functioning means empowers the first key group to instruct the second group of operations. Thus, with this capability, an additional key group which would otherwise be required for instructing the second group of operations need not be provided on the recorder body, to the benefit of overall structural simplicity.

A VCR operating apparatus according to the invention in another aspect comprises a tuner, a menu processor and channel keys. The tuner is for selectively tuning broadcast frequencies. The menu processor is for carrying out given processes in a menu mode. The channel keys are employed for alternatively selecting between a channel-select instruction for instructing the tuner to select a broadcast frequency, and a menu instruction for instructing the menu processor to carry out selected programming processes.

Thus, it is possible to command either the channel-select instruction or the menu instruction through only the channel keys, without any additional keys such as would function solely for menu instruction; consequently the number of keys is minimized.

The foregoing and other objects and advantages of the present invention will be more fully apparent from the following detailed description.

DESCRIPTION OF THE PREFERRED EMBODIMENTS

Figure 1:
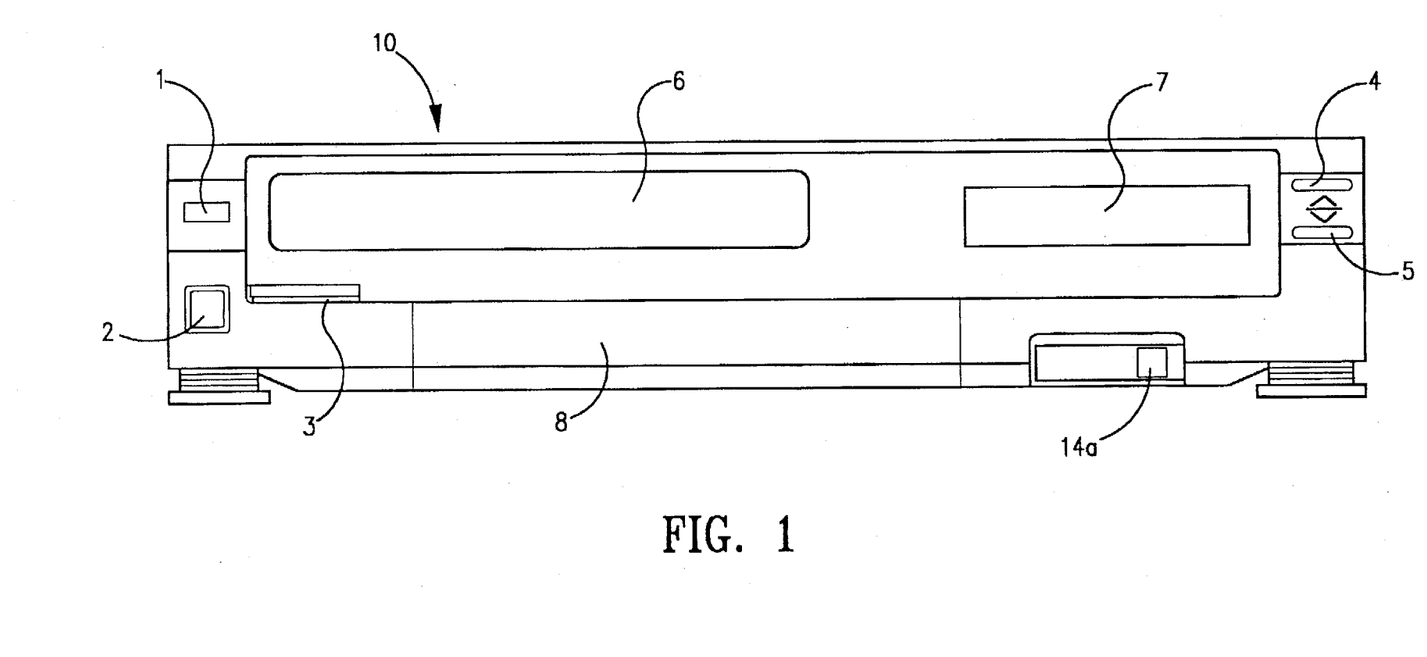
FIG. 1 is an elevational view of a video cassette recorder incorporating a first embodiment of the present invention.

FIG. 1 shows a video cassette recorder including the first embodiment according to the present invention.

Figure 2:
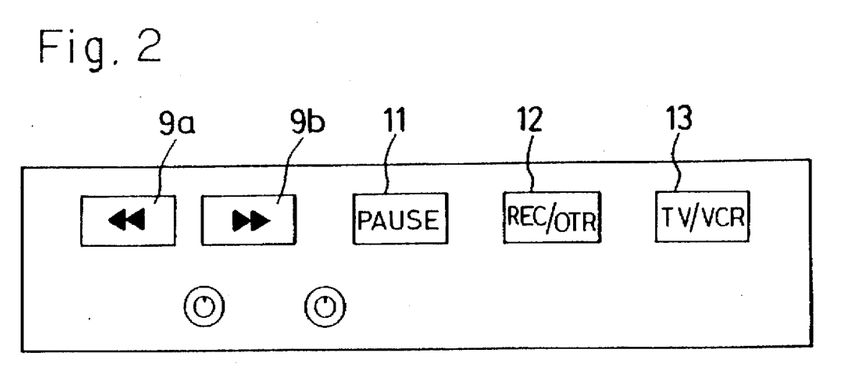
FIG. 2 is a facial view of keys disposed in a portion of the recorder front.

The VCR is so composed that all its functions are operable via a body front panel. On the front side of the recorder body 10 to the left in the figure are a POWER key 1, and an EJECT/STOP key 2 which is for the removal of a video cassette, and for stopping playback or recording. A PLAYback key 3 is provided to the right of the EJECT/STOP key 2. At the right side of the figure, a channel-up key 4 and a channel-down key 5 are shown provided. Provided to the right of the POWER key 1 are an insert slot 6 for the insertion of a video cassette, and a digital display 7. Along the front of the recorder body 10 is a hinged door panel 8 in which a REWind key 9a, an FF (fast-forward) key 9b, a PAUSE key 11, a REC/OTR (record/other) key 12 and a TV/VCR switchover key 13, as shown in FIG. 2 are provided. The TV/VCR key 13 is for switching between a condition in which a television receiver (not shown) receives signals from antenna, and one in which the television receiver receives output from the VCR.

Moreover, as shown in FIG. 1, a remote control receiver 14a is provided in the lower front part of the VCR.

Figure 3:
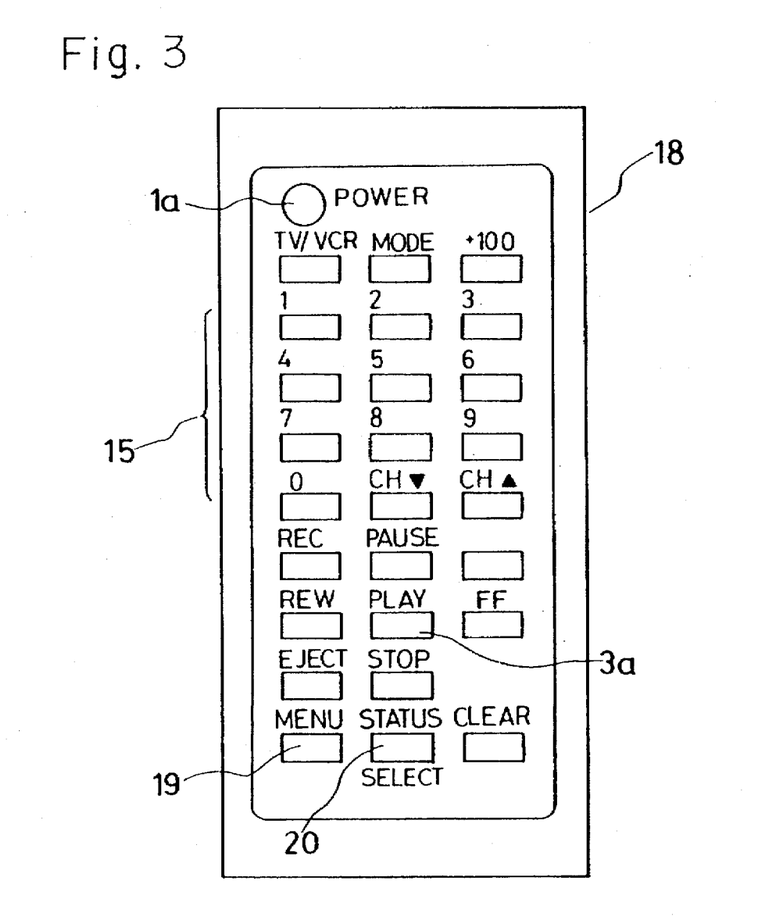
FIG. 3 is a plan view of a remote controller of the recorder.

The VCR is principally controlled by a remote controller 18, shown in FIG. 3. The remote controller 18 is furnished with keys corresponding to those included in the VCR main body, such as a POWER key 1a, and a PLAYback key 3a, as well as decimal keys 15, a MENU mode key 19 and a SELECT key 20, whereby all operations performed by the VCR may be instructed through the remote controller 18.

The VCR is also capable of displaying its operational routines utilizing an on-screen display function when the MENU key 19 is pushed.

Figure 4:
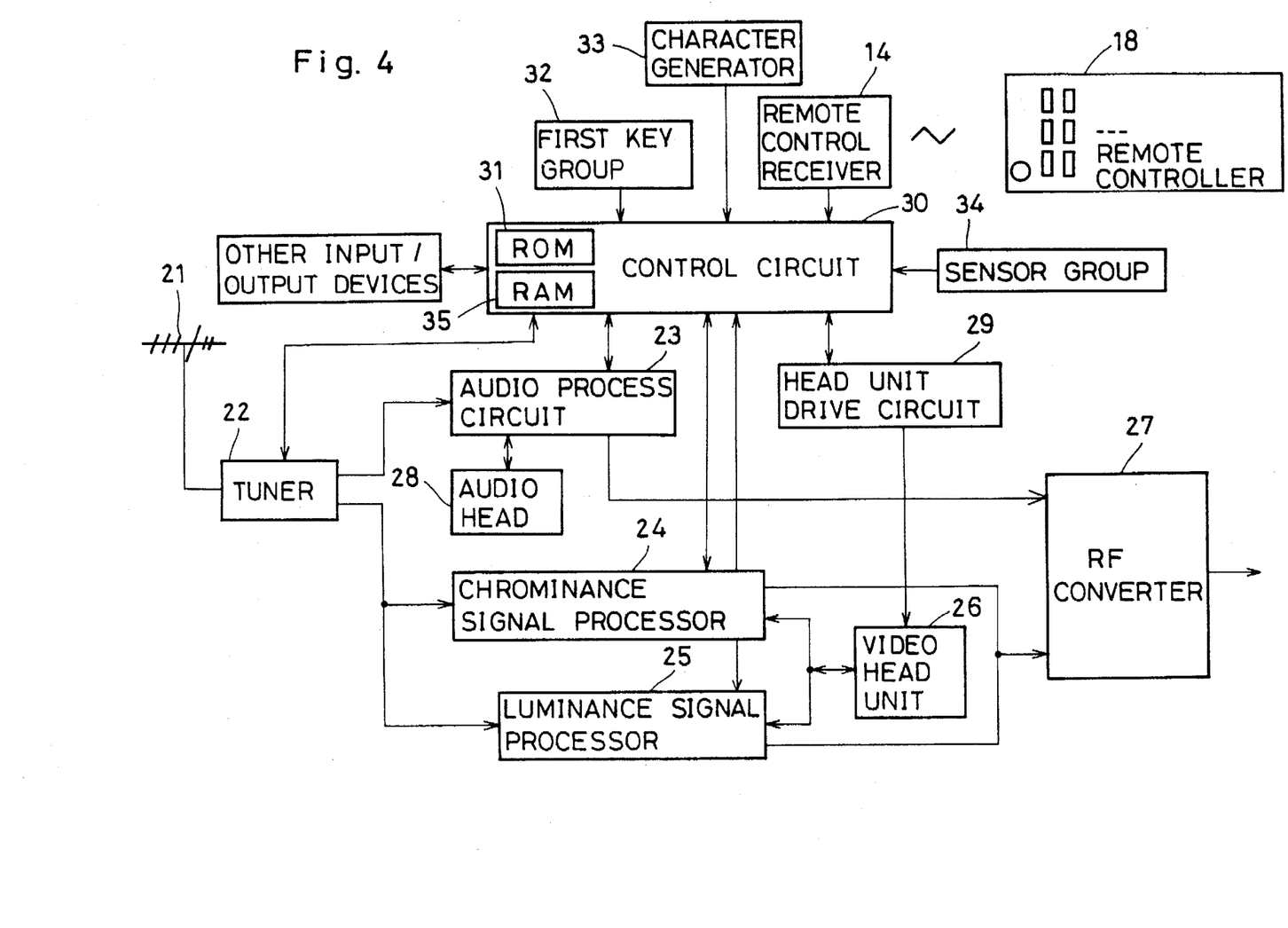
FIG. 4 is a block diagram of a control circuit of the recorder.

The basic structure of the circuit in the recorder body 10 will be explained with reference to the block diagram of FIG. 4.

An antenna 21 receives television signals and applies them to a tuner 22. The tuner 22 selects and amplifies the television signals and converts them to intermediate-frequency signals. (For example, 58.75 MHz for video and 54.25 MHz for audio.) The converted audio intermediate frequency signals are applied to an audio process circuit 23, and the converted video intermediate frequency signals are applied to a chrominance signal processor 24 and a luminance signal processor 25.

The resultant processed chrominance and luminance signals are applied to an RF converter 27. Wherein a video cassette is in recording, the signals are applied to a video head unit 26, thereby recording the video signals onto the tape. When the video tape is played, regenerated signals obtained from the video head unit 26 are processed by the chrominance signal processor 24 and the luminance signal processor 25, and then applied to the RF converter 27. The video head unit 26 is connected to a head unit drive circuit 29. The head unit drive circuit 29 is for servocontrol of the video head unit 26.

The audio process circuit 23 extracts audio signals by demodulating and amplifying the audio intermediate frequency signals and applying them to the RF converter 27. Wherein video tape is recording, the audio process circuit 23 applies the audio signals to an audio head 28. Wherein video tape is playing, the audio process circuit 23 processes regenerated signals obtained from the audio head 28 and applies them to the RF converter 27.

The RF converter 27 converts received chrominance signals, luminous signals and audio signals into television antenna input signals and sends them to the antenna of the television receiver.

The aforedescribed tuner 22, the audio process circuit 23, the chrominance signal processor 24, the luminance signal processor 25 and the head unit drive circuit 29 are connected to a control circuit 30.

The control circuit 30 is a microcomputer which includes a ROM 31 and a RAM 35, and to which the first key group 32 provided on the recorder body 10 as shown in FIG. 1 and FIG. 2, a character generator 33, and a receiver 14 for receiving signals from the remote controller 18 are connected. Furthermore, a sensor group 34 which performs various sensing functions, as well as other input and output devices, are connected to the control circuit 30.

The ROM 31 is built into the microcomputer of the control circuit 30 and stores character display data to drive the connected television display as well as programs for several control routines. The CG 33 stores data pertaining to the English alphabet and other symbols.

Figure 5:
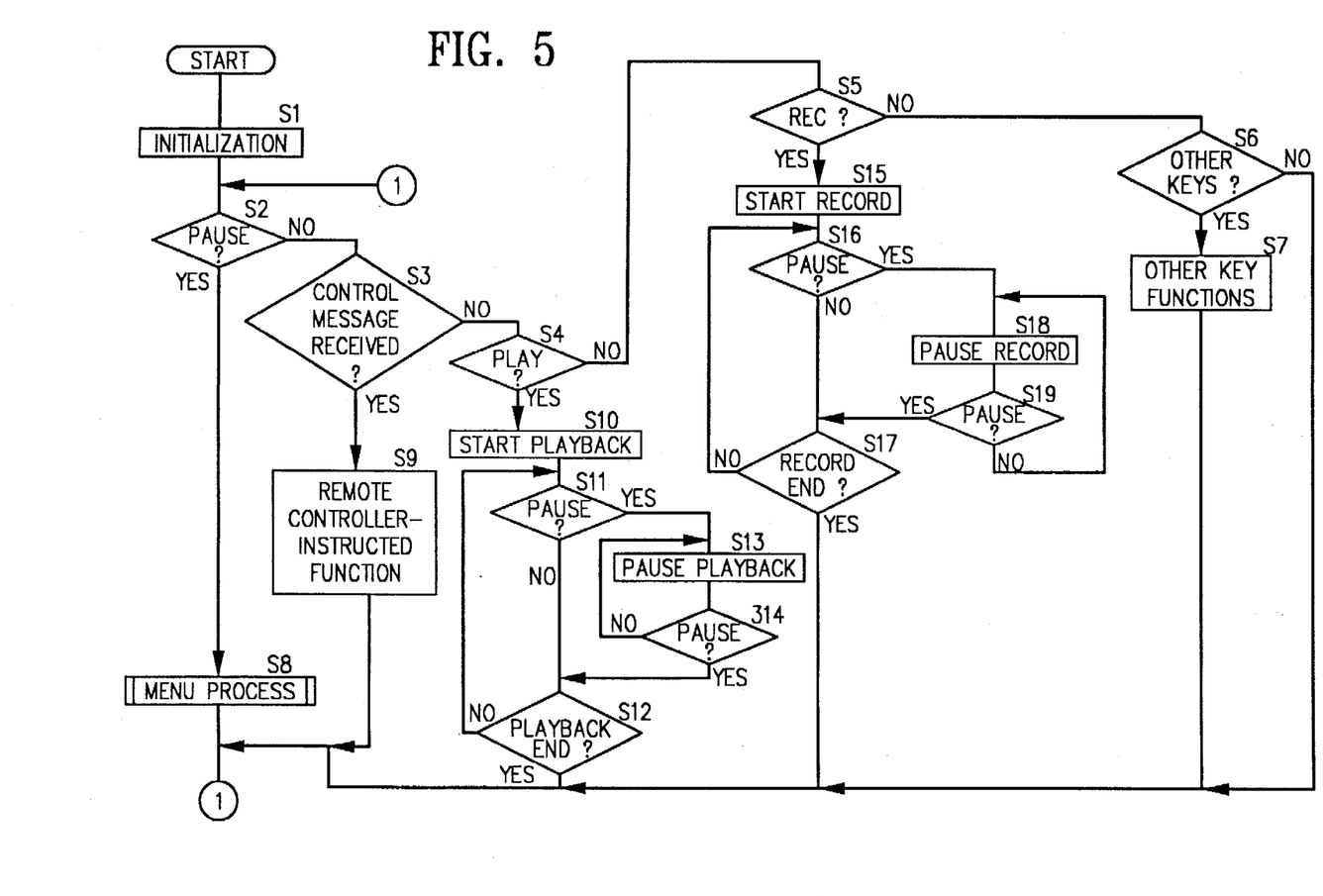
FIG. 5 is a recorder control process flowchart.

Operation in control of the VCR will hereinafter be described, with reference to the control process flowchart of FIG. 5.

When the power key 1a of the remote controller 18 or the power key 1 of the recorder body 10 is actuated, an initialization is carried out at step S1. At step S2, it is determined whether or not the pause key 11 has been pressed. The pause key 11 operated at this stage instructs the menu mode. Wherein it is determined that the pause key 11 has not been pressed, the program proceeds from step S2 to step S3. At step S3, it is determined whether or not any message has been received from the remote controller 18 through the receiver 14. If the determination is negative, the program proceeds from step S3 to step S4.

At step S4, it is determined whether or not the play key 3 has been pressed. If the play key 3 has not been pressed, the program proceeds to step S5, wherein it is determined whether or not the REC key 12 has been pressed. If the REC key 12 has not been pressed, the program proceeds from S5 to step S6, wherein it is determined whether or not any other keys have been pressed. If no other keys have been pressed, the program returns to step S2, whereas if other of the keys have been pressed, the program proceeds to step S7, wherein the designated processes are accordingly carried out.

At step S2, wherein it is determined that the pause key 11 has been pressed, the program proceeds to step S8. At step S8, operation in the menu process (hereinafter described) is enabled. If at step S3 it is determined that any instructions have been received from the remote controller 18, the program proceeds to step S9, wherein the process instructed via encoding though the remote controller keys is executed accordingly.

At step S4, if it is determined that the play key 3 has been pressed, the program proceeds to step S10. At step S10 tape playback begins, then, at step S11 it is determined whether or not the pause key 11 has been pressed. If it is determined that the pause key has not been pressed, the program proceeds to step S12, wherein it awaits playback termination, effected through the EJECT/STOP key 2. Upon termination of playback, the program returns to step S2. Meanwhile, at step S11, if it is determined that the pause key 11 has been pressed, the program proceeds to step S13, wherein playback is paused. At step S14, it is determined whether the pause key 11 has been pressed again or not. If not, the program returns to step S13, maintaining pause until the pause key 11 is pressed again, and then it proceeds to step S12.

At step S5, if it is determined that the REC key 12 has been pressed, the program proceeds to step S15, wherein the recording operation is started. At step S16, it is determined whether or not the pause key 11 has been pressed. If the determination is negative at step S16, the program proceeds to step S17. At step S17, the program awaits termination of the recording operation effected through the EJECT/STOP key 2. The program returns continuously to step S16 until recording is terminated, whereupon it returns to step S2. In the meantime, at step S16, if it is determined that the pause key 11 has been pressed, the program proceeds to step S18, wherein the recording operation is paused. At step S19, it is determined whether or not the pause key 11 has been pressed again. If so, the program proceeds to step S17; if not, it returns to step S18.

As will be clear from the foregoing the pause key 11 serves as a key which can realize the menu display function primarily operated by the menu key 19 of the remote controller 18, wherein the VCR is not operating in its record, playback, etc., modes. When the VCR is in any of its operational modes, the pause key 11 serves to pause the respective VCR operation.

Figure 6:
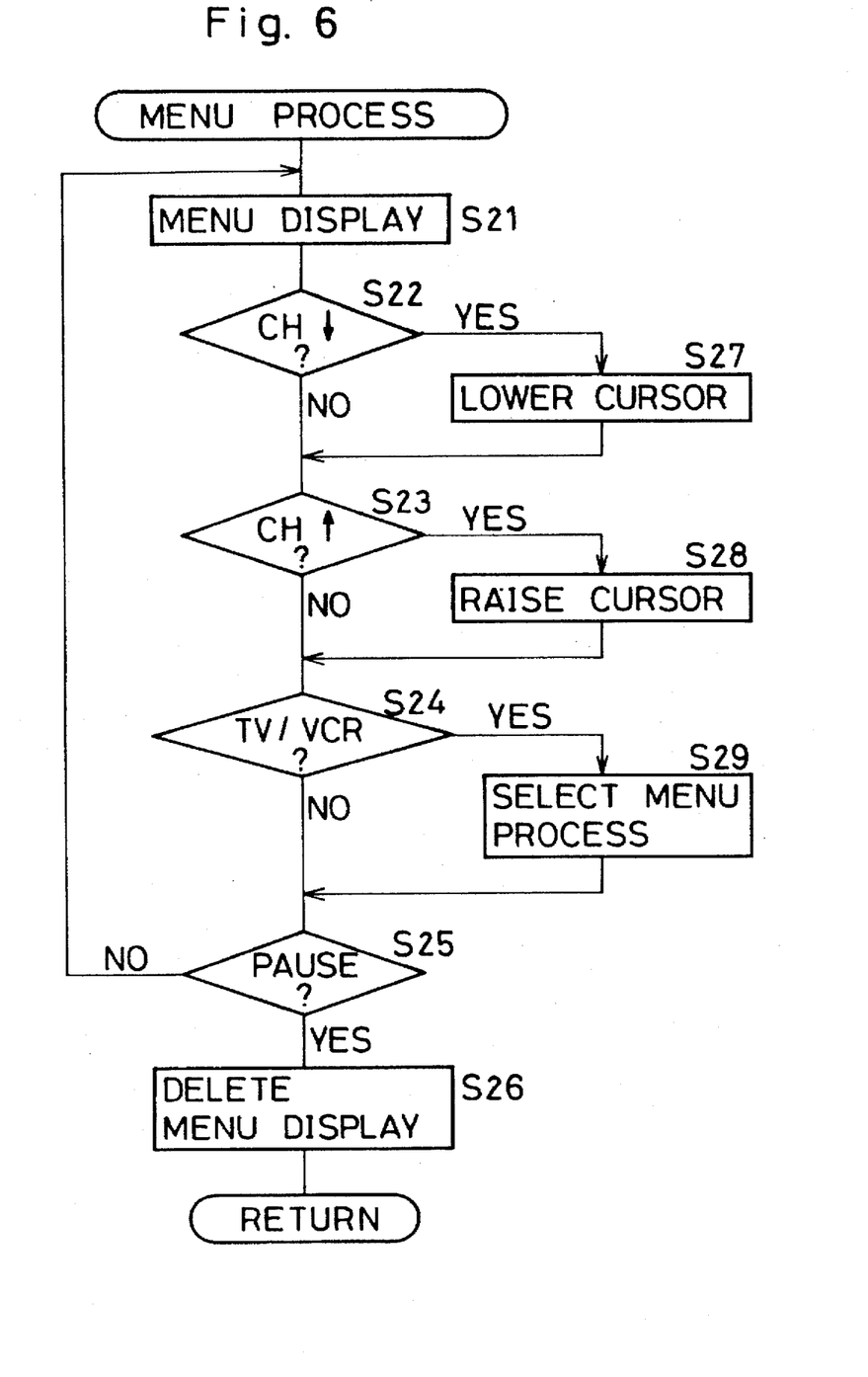
FIG. 6 is a process flowchart in a menu mode.
Figure 7:
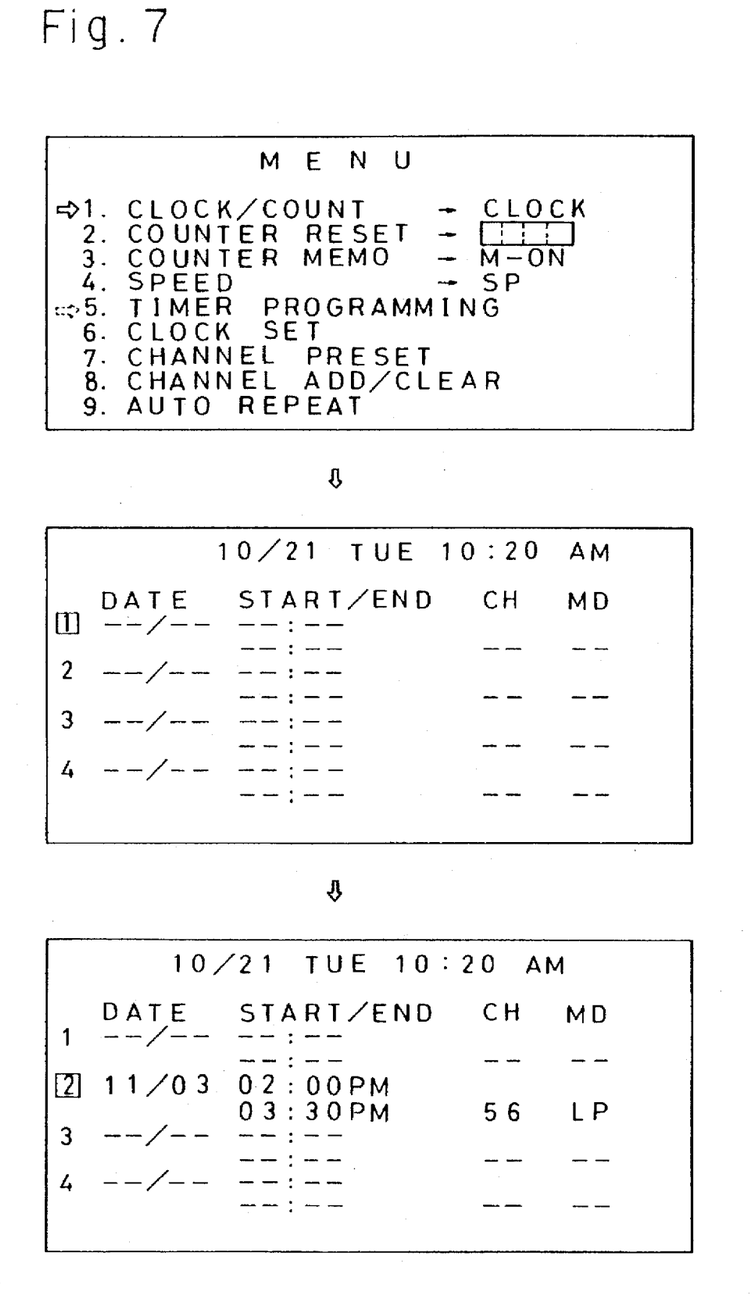
FIG. 7 is a view of a display condition.

FIG. 6 shows a menu process flowchart. At step S21, the menu as shown in FIG. 7 is displayed on the television display. At step S22, it is determined whether or not the channel-down key 5 has been pressed, and at step S23, whether or not the channel-up key 4 has been pressed. At step S24, it is determined whether or not the TV/VCR switchover key 13 has been pressed. At step S25, it is determined whether the pause key 11 has been pressed or not, and if the determination therein is YES, the program proceeds to step S26, wherein the program deletes the menu display and then returns to the main routine.

If it is determined that the channel-down key 5 has been pressed at step S22, the program proceeds to step S27. At step S27, the cursor (indicated by a blank arrow) goes down the on-screen display corresponding to the number of operations of the channel-down key 5. If it is determined that the channel-up key 4 has been pressed at step S23, the program proceeds to step S28, at which the cursor goes up corresponding to the number of operations of the channel-up key 4.

At step S24, if it is determined that the TV/VCR switchover key 13 has been pressed, the program proceeds to step S29. The TV/VCR switchover key 13 is therein employed in lieu of the select key 20 of the remote controller 18 to select in setting that menu item next to which the cursor has been positioned.

An exemplary procedure will be explained using the timer programing operation as an example. Initially, the blank-arrow cursor is positioned at "1. CLOCK/COUNT" as shown at the top of the list in FIG. 7. This menu item "CLOCK/COUNT" is for selecting between the clock and counter displays of the digital display 7. If the channel-down key 5 is held pressed to move the cursor to the "5. TIMER PROGRAMMING" position indicated by the dashed arrow, and the TV/VCR switchover key 13 is pressed, then an initial table for timer programing as shown in the middle of FIG. 7 is displayed. The cursor positioned over the numbers to the left moves in response to the operation of the channel-up key 4 or the channel-down key 5, accordingly. Following selection of the program number thus, the TV/VCR switchover key 13 is pressed to set the program number. Date, start time, end time, channel number, tape speed and the like are selected by the channel-up key 4 or the channel-down key 5 and set with the TV/VCR switchover key 13. Shown in the lower section of FIG. 7, the timer has been programmed to operate wherein the program on channel 56 will be recorded at tape speed LP from two o'clock to three thirty in the afternoon on November third. Thus the invention in this embodiment employs the pause key 11 and the TV/VCR switchover key 13 in lieu of the menu key 19 and the select key 20 on the remote controller 18, whereby the lesser number of keys on the recorder body 10 nonetheless enables performance of the same functions as via the remote controller 18.

The second embodiment according to the present invention will now be explained, wherein explanation of structures and operations in common with the first embodiment is omitted.

Figure 8:
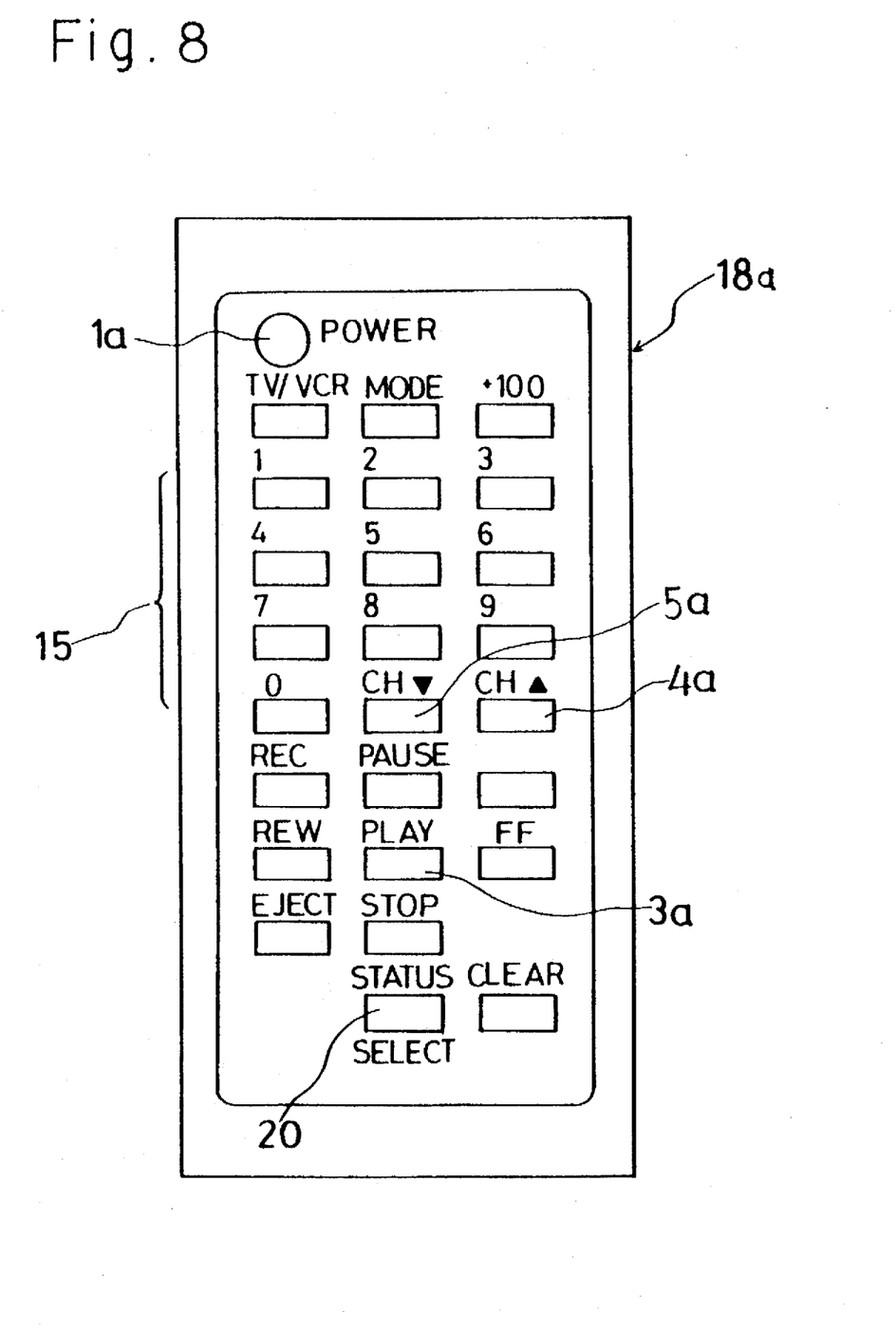
FIG. 8 is a view corresponding to FIG. 3 of a second embodiment.

The VCR is operated with a remote controller 18a as shown in FIG. 8. The remote controller 18a is provided with one key group comprising a power key 1a, a play key 3a, a channel-up key 4a, a channel-down key 5a and the like and another key group comprising decimal keys 15, and a select key 20 and the like, whereby all operations of the VCR can be commanded via the remote controller 18a. Unlike as in the first embodiment, the remote controller 18a is not provided with a menu key.

Display in connection with operation of the VCR is provided by an on-screen display capability of the television receiver to which it is connected. When either of the channel-up keys 4/4a or the channel-down keys 5/5a is operated, the channel numbers called and a menu for setting up various functions are displayed on screen.

Figure 9:
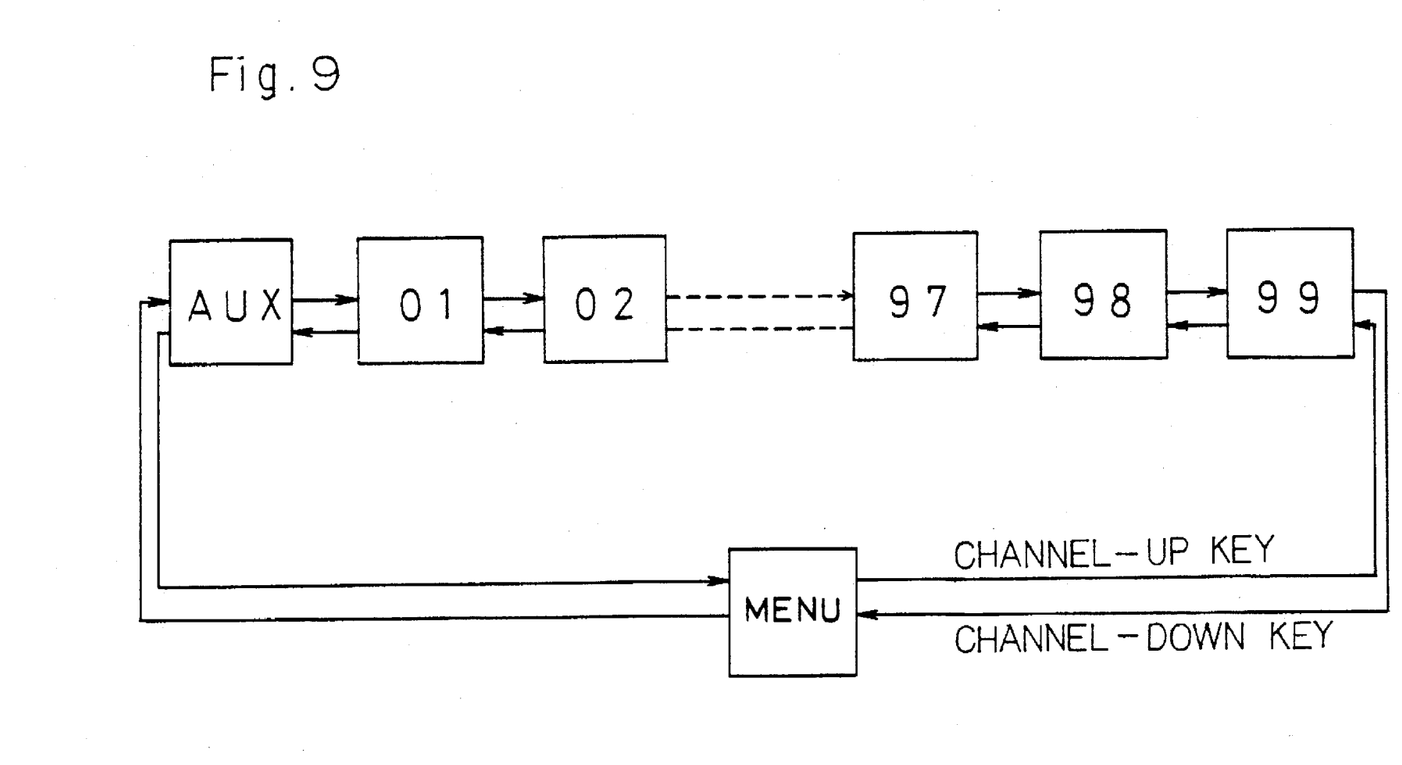
FIG. 9 is a diagram illustration of a channel-change condition.

In this VCR, the channel-up keys 4/4a and the channel-down keys 5/5a can select one from among one hundred and one channel statuses including ninety-nine TV channel numbers 01–99, an auxiliary function AUX for input and output of video signals and audio signals via outside video devices, and a menu display function for setting up recording reservations and the like, as shown in FIG. 9.

Figure 10:
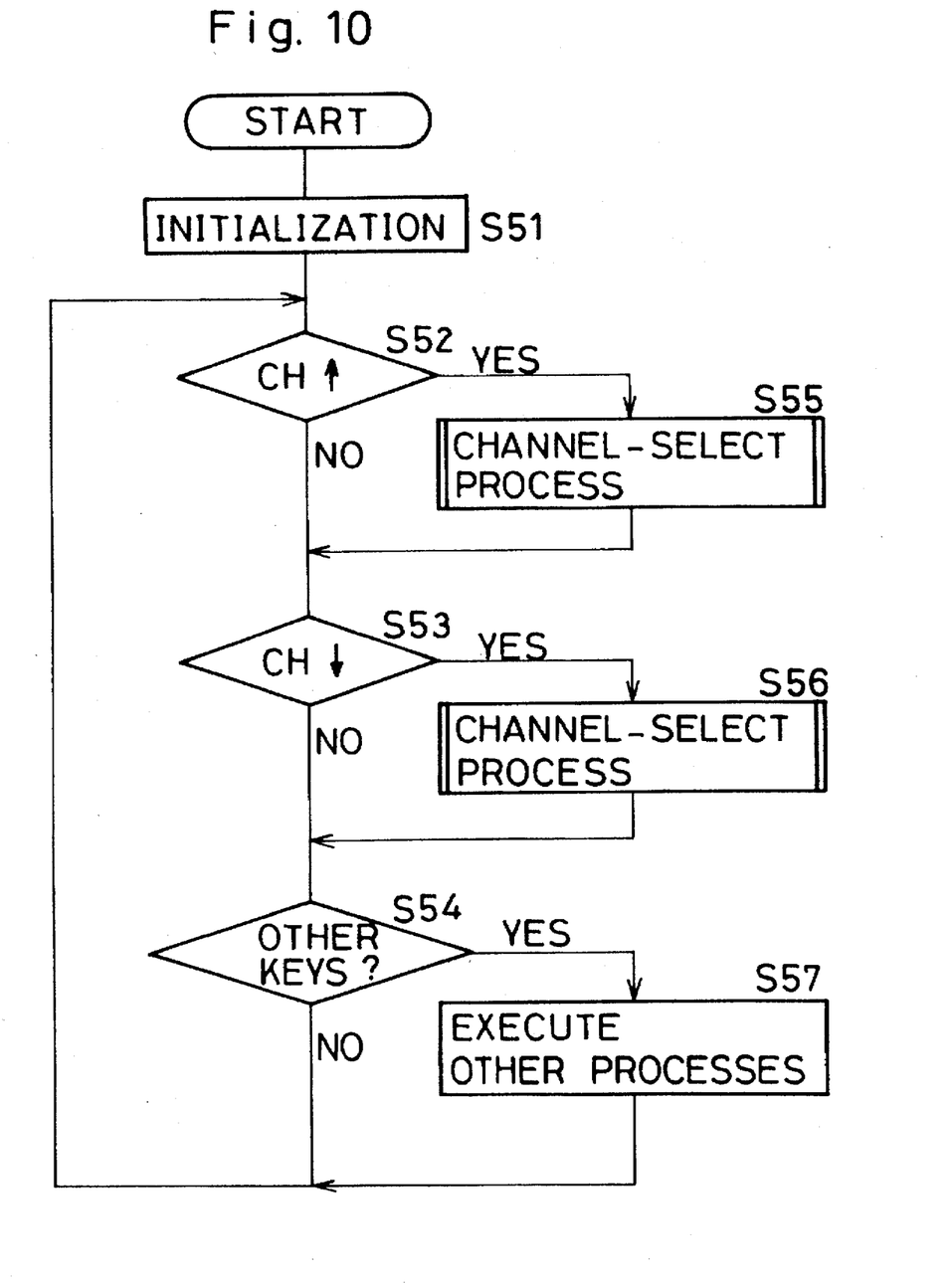
FIG. 10 is a process control flowchart of the second embodiment corresponding to FIG. 5.

Operation in control of the VCR according to the second embodiment will hereinafter be described, with reference to the control process flowchart of FIG. 10.

When either the power key 1a of the remote controller 18a or the power key 1 of the recorder body 10 is turned on, an initialization is carried out at step S51, essentially in which the content stored in the RAM 35 in the control circuit 30 becomes the initial channel status. That is, the channel condition set prior to power-off is set initially. At step S52, it is determined whether or not either of the channel-up keys 4/4a has been pressed. The channel-up keys 4/4a are herein used for selecting the channel status. If it is determined that neither of the channel-up keys 4/4a has been pressed, the program proceeds from step S52 to step S53. At step S53, it is determined whether or not either of the channel-down keys 5/5a has been pressed. If it is determined that neither has been pressed, the program proceeds from step S53 to step S54. At step S54, it is determined whether or not additional keys have been pressed. If the determination is negative, the program returns to step S52. If any auxiliary keys have been pressed, the program proceeds to step S57, wherein the program executes corresponding processes according to the key pressed.

At step S52, if it is determined that either of the channel-up keys 4/4a has been pressed, the program proceeds to step S55, wherein the program executes a channel-select process (hereinafter described). If it is determined that either of the channel-down keys 5/5a has been pressed at step S53, the program proceeds to step S56, wherein the program executes the channel-select process as well.

Figure 11:
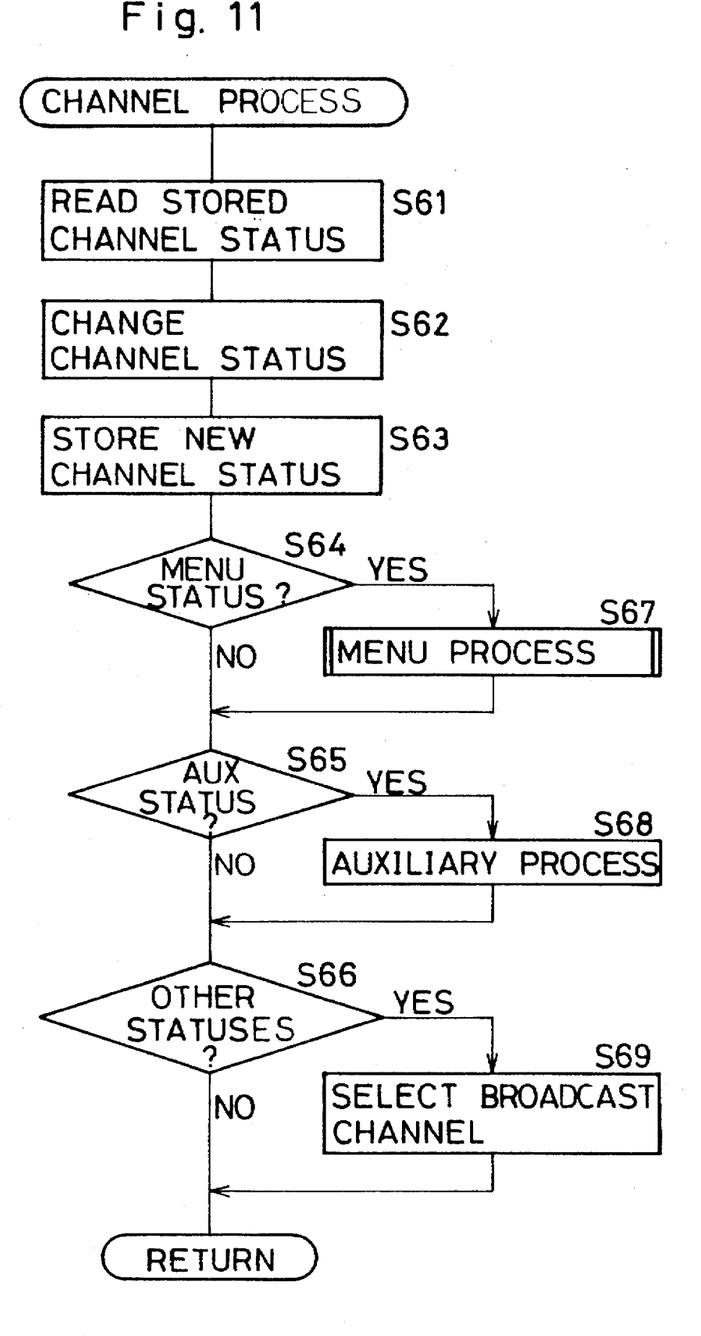
FIG. 11 is a channel-select process flowchart of the second embodiment.

Regarding the channel-select process, to begin with, at step S61 as shown in FIG. 11, the channel status stored in the RAM 35 is read out. At step S62, the channel status is changed according to the key pressed. For example, when the channel-up key 4/4a is pressed, the channel status is incremented. If the channel-down key 5/5a is pressed, the channel status is decremented. At step S63, the changed channel status is stored into the RAM 35. Then by steps S64 through S66, what the channel status has become is determined.

Specifically, at step S64, it is determined whether or not the changed channel status is the menu status. At step S65, it is determined whether or not the changed channel status is the AUX status. At step S66, it is determined whether or not the changed channel status is an "other" status, i.e., one of the statuses for selecting TV channels. At step S66, if the determination is NO, the program returns to the main routine.

At step S64, if it is determined that the channel status is the menu status, the program proceeds to step S67, wherein the processes in connection with the menu process as shown in FIG. 6 are carried out. If it is determined that channel status is the AUX status at step S65, the program proceeds to step S68, wherein the AUX process is carried out. Therein, signals are exchanged with such video devices as may be connected to external input and output terminals. If it is determined that the channel status is an "other" status at step S66, the program proceeds to step S69, wherein the tuner 22 is controlled to tune the broadcast channel frequency corresponding to the selected TV channel number.

In the menu process at step S67, various processes as in the first embodiment are likewise carried out. In this second embodiment, the channel-up keys 4/4a, or the channel-down keys 5/5a are used to bring up the menu display, without the use of a single-function menu key. Thereby fewer keys nonetheless can carry out the menu processes.

Various details of the invention may be changed without departing from its spirit nor its scope. Furthermore, the foregoing description according to the present invention is provided for the purpose of illustration only, and not for the purpose of limiting the invention as defined by the appended claims and their equivalents.

What is claimed is:

1. In a video cassette recorder (VCR) assembly having a VCR body and a VCR control apparatus responsive to a VCR remote controller having remote controller keys, the VCR control apparatus comprising:

a first key group on said VCR body for inputting instructions for a first group of VCR control functions;

means for receiving remote instructions associated with said remote controller keys of said VCR remote controller for a second group of VCR control functions, said second group of VCR control functions being different from said first group of VCR control functions; and a multi-function enablement key included within said first key group, which is capable of concurrently storing at least a first instruction and a second instruction, wherein said first instruction is one of said first group of VCR control functions, said second instruction is one of said second group of VCR control functions, and said second instruction differs from said first instruction;

wherein said multi-function enablement key inputs said second instruction based on the operational state of the VCR and without use of said VCR remote controller.

2. In a video cassette recorder (VCR) assembly, having a VCR body and associated VCR remote controller, a VCR control apparatus comprising:

a first key group on said VCR body for inputting instructions for a first group of VCR control functions;

a second key group on said VCR remote controller for inputting instructions for a second group of VCR control functions, said second group of VCR control functions being different from said first group of VCR control functions; and a multi-function enablement key included within said first key group, which is capable of concurrently storing at least a first instruction and a second instruction, wherein said first instruction is one of said first group of VCR control functions, said second instruction is one of said second group of VCR control functions, and said second instruction differs from said first instruction;

wherein said multi-function enablement key inputs said second instruction based on the operational state of the VCR and without use of said VCR remote controller.

3. A video cassette recorder (VCR) assembly comprising:

a VCR body;

a VCR control circuit disposed within said VCR body and coupled to a VCR tape play and record mechanism also disposed within said VCR body;

a remote control sensor connected to said VCR control circuit;

a first key group mounted on said VCR body and connected to said VCR control circuit for inputting instructions for a first group of VCR control functions;

a remote control unit separate from said VCR body and in communication with Said VCR control circuit via said remote control sensor, said remote control unit having a second key group for inputting instructions for a second group of VCR control functions different from said first group of VCR control functions; and a multi-function enablement key included within said first key group, which is capable of concurrently storing at least a first instruction and a second instruction, wherein said first instruction is one of said first group of VCR control functions, said second instruction is one of said second group of VCR control functions, and said second instruction differs from said first instruction;

wherein said multi-function enablement key inputs said second instruction based on the operational state of the VCR and without use of said remote control unit.

4. A VCR assembly according to claim 3, wherein said VCR has a first operational state and a second operational state;

wherein said multi-function enablement key inputs said first instruction when said VCR is in said first operational state; and wherein said multi-function enablement key inputs said second instruction when said VCR is in said second optional state.

5. A VCR assembly according to claim 4, wherein said first instruction is a pause function for causing said VCR assembly to pause during recording or playback.

6. A VCR assembly according to claim 5, wherein said second instruction is a menu programming control function for causing said VCR assembly to generate a programming menu display having several items for display on a television receiver connected to said VCR assembly.

7. A VCR assembly according to claim 4, wherein said first instruction is a television receiver/video tape recorder switchover function for switching between a tuner of a television and a tuner of said VCR assembly.

8. A VCR assembly according to claim 7, wherein said second instruction is a select function for selecting a desired item from among several items of a programming menu.

9. A VCR assembly according to claim 4, wherein when said VCR is in said first operational state, said VCR is performing one of a record operation or a play operation.

10. A VCR assembly according to claim 4, wherein when said VCR is in said second operational state, said VCR is not performing one of a record operation or a play operation.

11. A VCR assembly according to claim 3, wherein said remote control unit further has a third key group for inputting instructions for said first group of VCR control functions.

12. A VCR assembly according to claim 11, wherein:
said first key group includes a first key group pause key for inputting a pause instruction to pause operation of said VCR assembly both when said VCR assembly is in a recording mode and when said VCR assembly is in a playback mode; and
said third key group includes a third key group pause key for inputting said pause instruction.

13. A VCR assembly according to claim 12, wherein said second key group includes a programming menu key for inputting an instruction which displays a programming menu.

14. A VCR assembly according to claim 13, wherein said multi-function enablement key is said first key group pause key.

15. A video cassette recorder (VCR) assembly comprising:
a VCR body;
a VCR control Circuit disposed within said VCR body and coupled to a VCR tape play and record mechanism also disposed within said VCR body;
a remote control sensor connected to said VCR control circuit;
a first key group mounted on said VCR body and connected to said VCR control circuit for inputting instructions for a first group of VCR control functions;
a remote control unit separate from said VCR body and in communication with said VCR control circuit via said remote control sensor, said remote control unit having a second key group for inputting instructions for a second group of VCR control functions different from said first group of VCR control functions; and
a double-function key included within said first key group, which is capable of concurrently storing a first instruction and a second instruction, wherein said first instruction is one of said first group of VCR control functions, said second instruction is one of said second group of VCR control functions, and said second instruction differs from said first instruction;
wherein said multi-function enablement key inputs said second instruction based on the operational state of the VCR and without use of said remote control unit.

16. A VCR assembly according to claim 15, wherein said first instruction is a pause function for causing said VCR assembly to pause during recording or playback.

17. A VCR assembly according to claim 16, wherein said second instruction is a menu programming control function for causing said VCR assembly to generate a programming menu display having several items for display on a television receiver connected to said VCR assembly.

18. A VCR assembly according to claim 15, wherein VCR has a first operational state and a second operational state;
wherein said double-function key inputs said first instruction when said VCR is in said first operational state; and
wherein said multi-function enablement key inputs said second instruction when said VCR is in said second operational state.

19. A VCR assembly according to claim 15, wherein said first instruction is a television receiver/video tape recorder switchover function for switching between a tuner of a television and a tuner of said VCR assembly.

20. A VCR assembly according to claim 19, wherein said second instruction is a select function for selecting a desired item from among several items of a programming menu.

21. A VCR assembly according to claim 15, wherein when said VCR is in said first operational state, said VCR is performing one of a record operation or a play operation.

22. A VCR assembly according to claim 15, wherein said remote control unit further has a third key group for inputting instructions for said first group of VCR control functions.

23. A VCR assembly according to claim 22, wherein:
said first key group includes a first key group pause key for inputting a pause instruction to pause operation of said VCR assembly both when said VCR assembly is in a recording mode and when said VCR assembly is in a playback mode; and
said third key group includes a third key group pause key for inputting said pause instruction.

24. A VCR assembly according to claim 23, wherein said second key group includes a programing menu key for inputting an instruction which displays a programing menu.

25. A VCR assembly according to claim 24, wherein said double-function key is said first key group pause key.

26. A VCR assembly according to claim 15, wherein when said VCR is in said second operational state, said VCR is not performing one of a record operation or a play operation.

27. In a video cassette recorder (VCR) assembly having a VCR body and a VCR control apparatus responsive to a VCR remote controller having remote controller keys, the VCR control apparatus comprising:
a first key group on said VCR body for inputting instructions for a first group of VCR control functions;
means for receiving remote instructions associated with said remote controller keys of said VCR remote controller for a second group of VCR control functions, said second group of VCR control functions being different from said first group of VCR control functions; and
a double-function key included within said first key group, which is capable of concurrently storing a first instruction and a second instruction, wherein said first instruction is one of said first group of VCR control functions, said second instruction is one of said second group of VCR control functions, and said second instruction differs from said first instruction;
wherein said multi-function enablement key inputs said second instruction based on the operational state of the VCR; and without use of said VCR remote controller.

28. A video cassette recorder (VCR) assembly comprising:
a VCR body;
a VCR control circuit disposed within said VCR body and coupled to a VCR tape play and record mechanism also disposed within said VCR body;
a remote control sensor connected to said VCR control circuit;
a remote control unit separate from said VCR body and in communication with said VCR control circuit via said remote control sensor;

a first key group on said VCR body for inputting instructions for VCR function control; and a second key group on said VCR remote controller unit for inputting instructions for VCR function control, said second key group inputs instructions that are different from the the first key group's instructions;

said second key group including at least a menu key for inputting an instruction to display a menu on a screen of a television; and said first key group including at least a first double-function key capable of concurrently storing both a first instruction to display said menu on said screen of said television, and a second instruction for VCR control, said first instruction differs from said second instruction;

wherein said first double-function key inputs said second instruction based on the operational state of the VCR, and without use of the remote control unit; and wherein when said VCR is performing one of a record operation or a play operation, said first double-function key inputs said second instruction.

29. A VCR assembly according to claim 28, wherein said first key group further comprises:

a second double-function key capable of concurrently storing both a first instruction of a key of said first key group, and a second instruction of a key of said second key group;

wherein said second double-function key differentiates use of said first and second instructions according to whether the VCR is or is not in a menu display mode.

30. A VCR assembly according to claim 29, wherein the second instruction of said first double-function key is a pause instruction for pausing one of a record operation or a play operation.

31. A VCR assembly according to claim 30, wherein said second double-function key's second function is to select desired options from a menu when said VCR is in a menu display mode, and said second double-function key's first function is to selectively change an output designation back and forth between one of a television output designation or a VCR output designation.

32. In a video cassette recorder (VCR) assembly, having a VCR body and associated VCR remote controller, a VCR control apparatus comprising:

a first key group on said VCR body for inputting instructions for a first group of VCR control functions;

a second key group on said VCR remote controller for inputting instructions for a second group of VCR control functions, said second group of VCR control functions being different from said first group of VCR control functions; and a double-function key included within said first key group, which is capable of concurrently storing a first instruction and a second instruction, wherein said first instruction is one of said first group of VCR control functions, said second instruction is one of said second group of VCR control functions, and said second instruction differs from said first instruction;

wherein said multi-function enablement key inputs said second instruction based on the operational state of the VCR; and without use of said VCR remote controller.

* * * * *